United States Patent
Kozumi et al.

(10) Patent No.: US 10,147,339 B2
(45) Date of Patent: Dec. 4, 2018

(54) EVALUATION APPARATUS AND EVALUATION METHOD

(71) Applicant: Komatsu Ltd., Tokyo (JP)

(72) Inventors: Susumu Kozumi, Isehara (JP); Hidemi Takahashi, Naka-gun (JP); Aki Tabata, Isehara (JP)

(73) Assignee: Komatsu Ltd., Tokyo (JP)

( * ) Notice: Subject to any disclaimer, the term of this patent is extended or adjusted under 35 U.S.C. 154(b) by 23 days.

(21) Appl. No.: 15/309,835

(22) PCT Filed: Mar. 28, 2016

(86) PCT No.: PCT/JP2016/059979
§ 371 (c)(1),
(2) Date: Nov. 9, 2016

(87) PCT Pub. No.: WO2016/137017
PCT Pub. Date: Sep. 1, 2016

(65) Prior Publication Data
US 2017/0278425 A1    Sep. 28, 2017

(51) Int. Cl.
*G09G 5/02*    (2006.01)
*G09B 19/24*    (2006.01)
(Continued)

(52) U.S. Cl.
CPC ............. *G09B 19/24* (2013.01); *E02F 3/32* (2013.01); *E02F 9/2004* (2013.01); *E02F 9/26* (2013.01);
(Continued)

(58) Field of Classification Search
CPC .................................. E02F 3/50; G09B 5/02
(Continued)

(56) References Cited

U.S. PATENT DOCUMENTS 3,854,608 A * 12/1974 Arnold ................ E02F 3/404
37/406
5,170,342 A * 12/1992 Nakamura ........... E02F 3/438
37/348
(Continued)

FOREIGN PATENT DOCUMENTS

| CN | 103559016 A | 2/2014 |
| CN | 103900669 A | 7/2014 |

(Continued)

OTHER PUBLICATIONS

International Search Report dated Jun. 7, 2016, issued for PCT/JP2016/059979.

*Primary Examiner* — Javid A Amini
(74) *Attorney, Agent, or Firm* — Locke Lord LLP

(57) ABSTRACT

An evaluation apparatus includes a detected data acquisition unit that acquires photograph data of a bucket of a work equipment, a first display control unit that displays the photograph data on a display screen of a display device, a second display control unit that displays on the display screen a graphic representing at least part of an outline of the bucket as viewed from a side, and moves the graphic on the display screen by an operation of an input device, and an identification unit that distinguishes the bucket from excavated material above an opening end of the bucket on the display screen based on the graphic aligned with the bucket.

11 Claims, 13 Drawing Sheets

(51) Int. Cl.
*E02F 3/32* (2006.01)
*E02F 9/20* (2006.01)
*E02F 9/26* (2006.01)
*G09B 5/02* (2006.01)
*G09B 19/16* (2006.01)
*H04N 5/232* (2006.01)
*H04N 5/445* (2011.01)
*G07C 5/00* (2006.01)
*E02F 9/22* (2006.01)
*G06F 3/0484* (2013.01)
*G06F 3/0488* (2013.01)

(52) U.S. Cl.
CPC ............... *G07C 5/008* (2013.01); *G09B 5/02* (2013.01); *G09B 19/167* (2013.01); *H04N 5/23293* (2013.01); *H04N 5/44504* (2013.01); *E02F 9/2271* (2013.01); *G06F 3/0488* (2013.01); *G06F 3/04845* (2013.01)

(58) Field of Classification Search
USPC .......................................... 345/629; 37/348
See application file for complete search history.

(56) References Cited

U.S. PATENT DOCUMENTS

| | | | | |
|---|---|---|---|---|
| 5,404,661 A * | 4/1995 | Sahm | ............... | E02F 3/427 37/347 |
| 5,438,771 A * | 8/1995 | Sahm | ............... | E02F 3/435 172/7 |
| 6,047,227 A * | 4/2000 | Henderson | ............ | E02F 9/2045 172/4.5 |
| 6,114,993 A * | 9/2000 | Henderson | .............. | G01S 19/14 342/357.27 |
| 6,131,061 A * | 10/2000 | DenBraber | ............. | E02F 3/435 37/348 |
| 6,148,254 A * | 11/2000 | Barden | ................... | E02F 3/435 172/4.5 |
| 6,236,924 B1 * | 5/2001 | Motz | .................. | A01B 69/008 172/4.5 |
| 6,282,477 B1 * | 8/2001 | Gudat | .................. | E02F 9/245 37/348 |
| 6,437,726 B1 * | 8/2002 | Price | ....................... | E02F 9/245 342/175 |
| 6,532,409 B1 * | 3/2003 | Fujishima | ............... | E02F 3/437 340/500 |
| 6,643,577 B1 * | 11/2003 | Padgett | ................... | E02F 9/166 172/2 |
| 6,728,619 B2 * | 4/2004 | Adachi | ..................... | E02F 9/26 342/357.75 |
| 6,782,644 B2 * | 8/2004 | Fujishima | ............... | E02F 3/435 340/679 |
| 6,832,175 B2 * | 12/2004 | Adachi | ..................... | E02F 9/20 37/348 |
| 7,077,601 B2 * | 7/2006 | Lloyd | .................. | E01C 23/065 180/209 |
| 7,513,070 B2 * | 4/2009 | Ogura | ...................... | G07C 3/08 172/2 |
| 7,532,967 B2 * | 5/2009 | Fujishima | ............. | E02F 9/2045 37/341 |
| 7,605,692 B2 * | 10/2009 | Yamada | .................... | E02F 9/26 340/425.5 |
| 8,091,256 B2 * | 1/2012 | Piekutowski | ........ | G01C 15/004 37/348 |
| 8,485,822 B2 * | 7/2013 | Lind | .................... | G06F 17/5095 273/400 |
| 9,697,654 B2 * | 7/2017 | Asada | ...................... | G07C 5/02 |
| 2004/0020083 A1 * | 2/2004 | Staub | ........................ | E02F 9/26 37/348 |
| 2006/0026101 A1 * | 2/2006 | Ogura | ...................... | G07C 3/08 705/50 |
| 2006/0265914 A1 * | 11/2006 | Gudat | .................... | E02F 9/245 37/348 |
| 2008/0133128 A1 * | 6/2008 | Koch | ..................... | E02F 3/435 37/348 |
| 2008/0226392 A1 * | 9/2008 | Lloyd | .................. | E01C 23/065 404/72 |
| 2016/0300405 A1 * | 10/2016 | Asada | .................... | G06Q 10/06 |
| 2017/0255895 A1 * | 9/2017 | Kozumi | ......... | G06Q 10/063114 |

FOREIGN PATENT DOCUMENTS

| | | | |
|---|---|---|---|
| JP | 2001-323517 A | | 11/2001 |
| JP | 2008-241300 A | | 10/2008 |
| JP | 2009-235833 A | | 10/2009 |
| JP | 2009235833 A | * | 10/2009 |
| JP | 2014148893 A | * | 8/2014 |
| JP | 2015-040422 A | | 3/2015 |

* cited by examiner

EVALUATION APPARATUS AND EVALUATION METHOD

FIELD

The present invention relates to an evaluation apparatus and an evaluation method.

BACKGROUND

A work vehicle including a bucket such as disclosed in Patent Literature 1 is used in excavation work at a construction site. There is a demand to be able to effectively scoop excavated material in one excavation operation by the bucket from the viewpoint of an improvement in construction efficiency when an operator operates the work vehicle for construction. The operator is required to have a skill in an effective excavation operation.

CITATION LIST

Patent Literature

Patent Literature 1: Japanese Laid-open Patent Publication No. 2008-241300

SUMMARY

Technical Problem

If the skill of an operator is objectively evaluated, points to be improved in operation become clear. Therefore, the operator is motivated to further improve his/her skill. Hence, there is a demand for a technology for detecting the excavation amount of a bucket and simply evaluating the skill of the operator.

An object of an aspect of the present invention is to provide an evaluation apparatus and evaluation method that can simply evaluate the skill of an operator of a work vehicle.

Solution to Problem

According to a first aspect of the present invention, an evaluation apparatus comprises: a detected data acquisition unit configured to acquire photograph data of a bucket of a work equipment; a first display control unit configured to display the photograph data on a display screen of a display device; a second display control unit configured to display on the display screen a graphic representing at least part of an outline of the bucket as viewed from a side and to move the graphic on the display screen by an operation of an input device; and an identification unit configured to distinguish the bucket from excavated material above an opening end of the bucket on the display screen based on the graphic aligned with the bucket.

According to a second aspect of the present invention, an evaluation method comprises: acquiring photograph data of a bucket of a work equipment; displaying the photograph data on a display screen of a display device; displaying on the display screen a graphic representing at least part of an outline of the bucket as viewed from a side; moving the graphic on the display screen based on input data generated by an operation of an input device; and distinguishing the bucket from excavated material above an opening end of the bucket on the display screen based on the graphic aligned with the bucket.

Advantageous Effects of Invention

According to an aspect of the present invention, an evaluation apparatus and evaluation method that can simply evaluate the skill of an operator of a work vehicle is provided.

DESCRIPTION OF EMBODIMENTS

Embodiments according to the present invention are described hereinafter with reference to the drawings. However, the present invention is not limited to the embodiments. Components of the embodiments described below can be combined as appropriate. Moreover, part of the components may not be used.

<Evaluation System>

Figure 1:
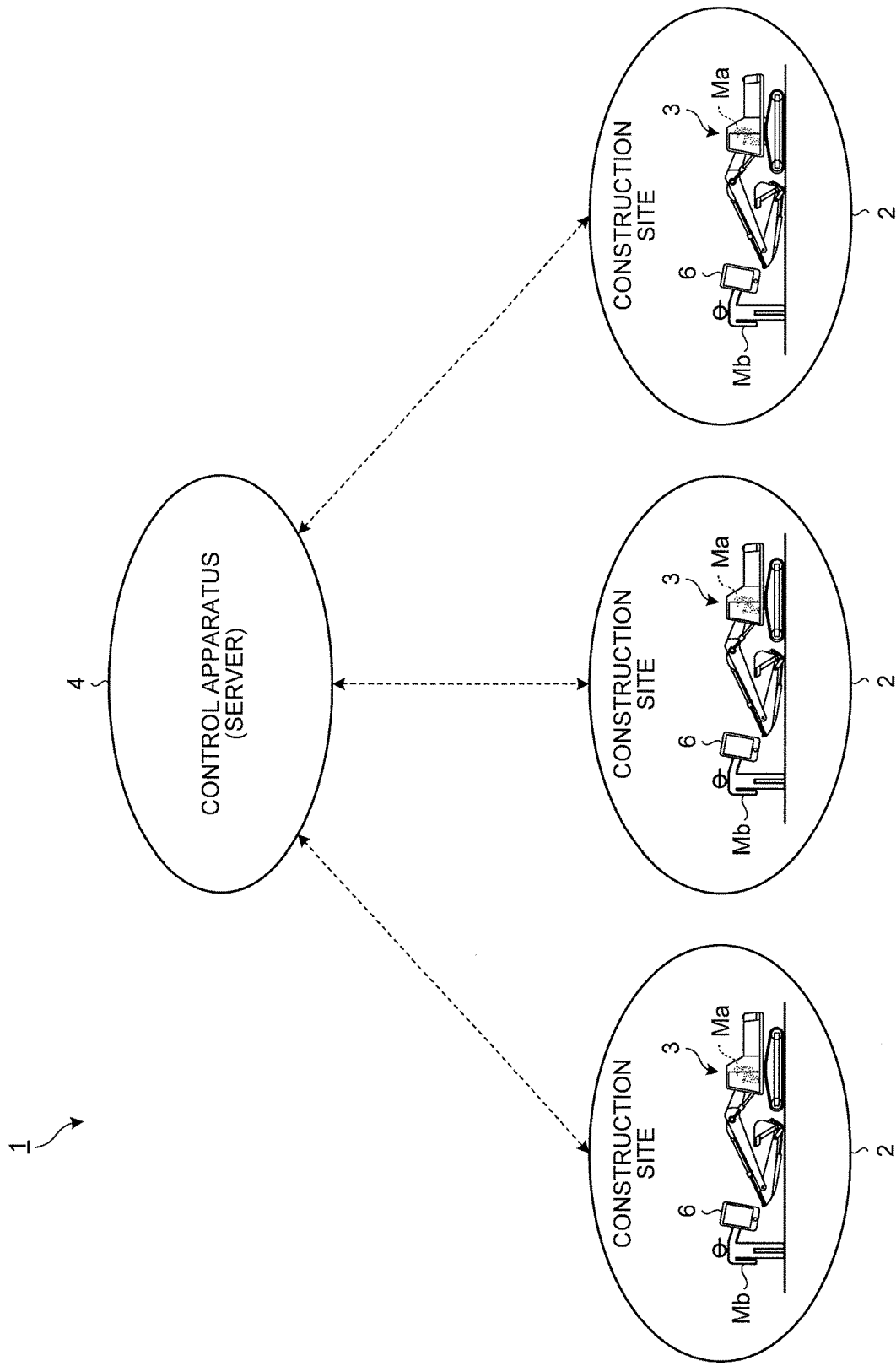
FIG. 1 is a diagram schematically illustrating an example of an evaluation system according to the embodiment.

FIG. 1 is a diagram schematically illustrating an example of an evaluation system 1 according to the embodiment. A work vehicle 3 operates at a construction site 2. The work vehicle 3 is operated by an operator Ma riding in the work vehicle 3. The evaluation system 1 makes one or both of an evaluation of the operation of the work vehicle 3 and an evaluation of the skill of the operator Ma who operates the work vehicle 3. The operator Ma operates the work vehicle 3 for construction at the construction site. A worker Mb, who is different from the operator Ma, works at the construction site 2. The worker Mb performs assistant work at, for example, the construction site 2.

The evaluation system 1 includes a control apparatus 4 having a computer system, and a mobile apparatus 6 having a computer system. The control apparatus 4 functions as a server. The control apparatus 4 provides services to clients including a user of the work vehicle 3 or a user of the mobile apparatus 6. The clients include at least one of the operator Ma, the worker Mb, an owner of the work vehicle 3, and a contractor to whom the work vehicle 3 is rented.

The mobile apparatus 6 is carried by at least one of the operator Ma and the worker Mb. The mobile apparatus 6 includes a mobile computer such as a smartphone or tablet personal computer.

The control apparatus 4 can perform data communication with a plurality of the mobile apparatuses 6.

<Work Vehicle>

Figure 2:
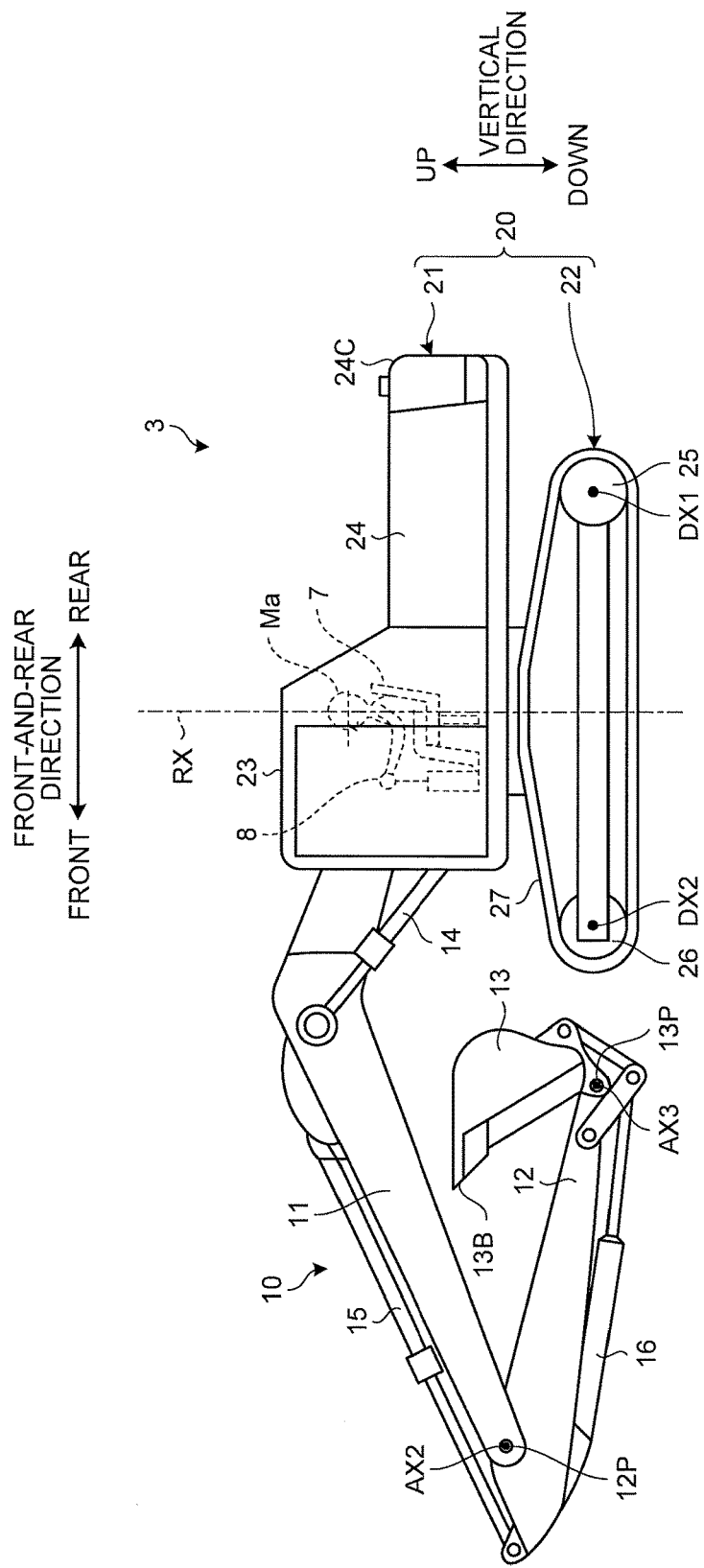
FIG. 2 is a side view illustrating an example of an excavator according to the embodiment.
Figure 3:
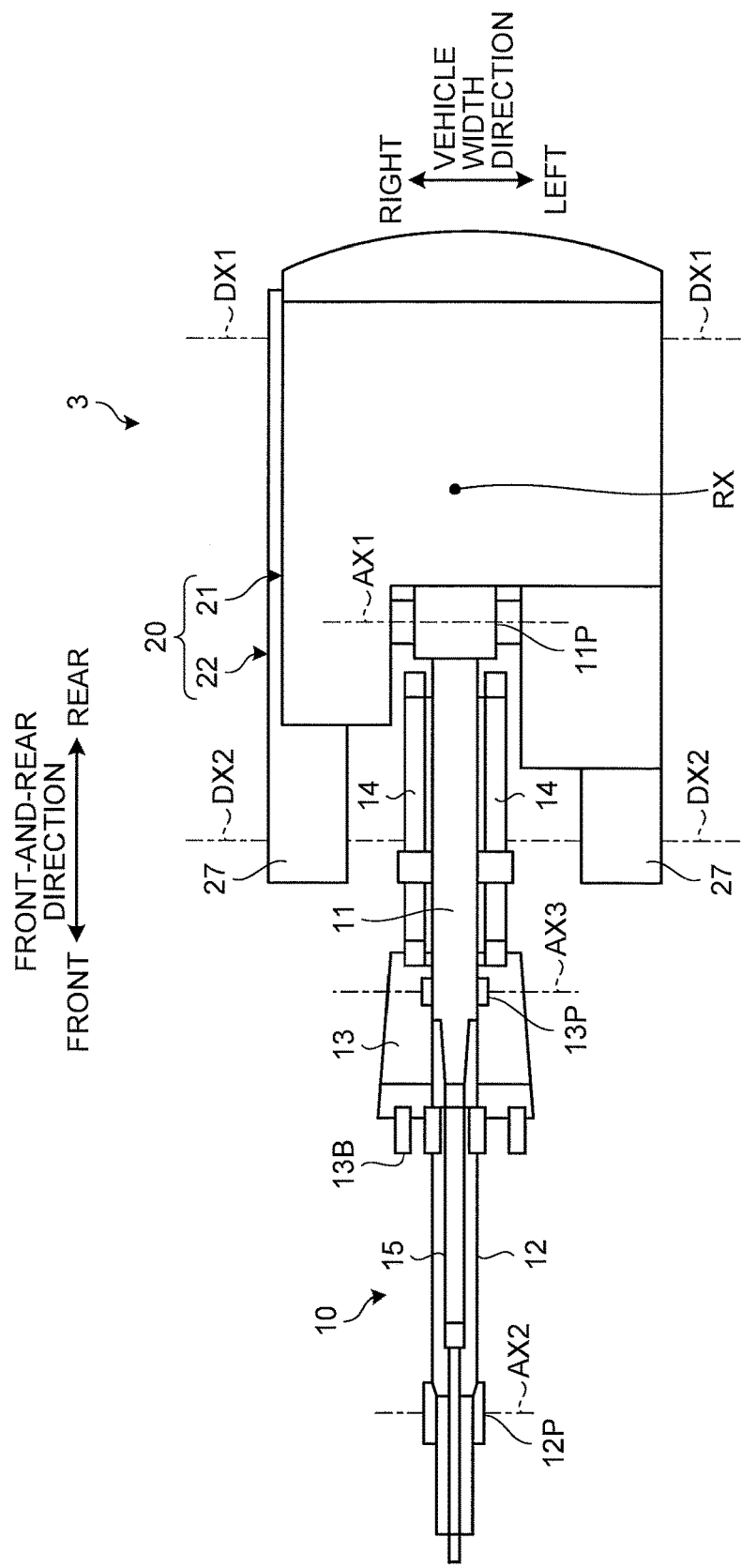
FIG. 3 is a plan view illustrating an example of an excavator according to a first embodiment.

Next, the work vehicle 3 according to the embodiment is described. In the embodiment, an example where the work vehicle 3 is an excavator is described. FIG. 2 is a side view illustrating an example of the excavator 3 according to the embodiment. FIG. 3 is a plan view illustrating an example of the excavator 3 according to the embodiment. FIG. 3 illustrates a plan view of the excavator 3 as viewed from above in such an attitude of work equipment 10 as in FIG. 2.

As illustrated in FIGS. 2 and 3, the excavator 3 includes the work equipment 10 that operates by hydraulic pressure, and a base machine 20 that supports the work equipment 10. The base machine 20 includes an upper structure 21 and an undercarriage 22 that supports the upper structure 21.

The upper structure 21 includes a cab 23, a machine room 24, and a counterweight 24C. The cab 23 includes a driver's compartment. A driver's seat 7 where the operator Ma is seated, and an operating device 8 that is operated by the operator Ma are placed in the driver's compartment. The operating device 8 includes operating levers for operating the work equipment 10 and the upper structure 21, and travel levers for operating the undercarriage 22. The work equipment 10 is operated by the operator Ma via the operating device 8. The upper structure 21 and the undercarriage 22 are operated by the operator Ma via the operating device 8. The operator Ma can operate the operating device 8 in a state of being seated in the driver's seat 7.

The undercarriage 22 includes drive wheels 25 called sprockets, idler wheels 26 called idlers, and crawlers 27 that are supported by the drive wheels 25 and the idler wheels 26. The drive wheel 25 operates by power generated by a drive source such as a hydraulic motor. The travel levers of the operating device 8 are operated to rotate the drive wheels 25. The drive wheel 25 rotates about a rotation axis DX1. The idler wheel 26 rotates about a rotation axis DX2. The rotation axis DX1 is parallel to the rotation axis DX2. The drive wheels 25 rotate to rotate the crawlers 27. Accordingly, the excavator 3 travels back and forth or turns.

The upper structure 21 can swing about a swing axis RX in a state of being supported by the undercarriage 22.

The work equipment 10 is supported by the upper structure 21 of the base machine 20. The work equipment 10 includes a boom 11 coupled to the upper structure 21, an arm 12 coupled to the boom 11, and a bucket 13 coupled to the arm 12. The bucket 13 has a plurality of convex blades. A plurality of cutting edges 13B being the blades' edges is provided. The cutting edges 13B of the bucket 13 may be, for example, an edge of a straight blade provided to the bucket 13.

The upper structure 21 and the boom 11 are coupled via a boom pin 11P. The boom 11 is supported by the upper structure 21 in a manner of being capable of operation pivoting on a rotation axis AX1. The boom 11 and the arm 12 are coupled via an arm pin 12P. The arm 12 is supported by the boom 11 in a manner of being capable of operation pivoting on a rotation axis AX2. The arm 12 and the bucket 13 are coupled via a bucket pin 13P. The bucket 13 is supported by the arm 12 in a manner of being capable of operation pivoting on a rotation axis AX3. The rotation axis AX1, the rotation axis AX2, and the rotation axis AX3 are parallel in a front-and-rear direction. The definition of the front-and-rear direction is described below.

In the following description, a direction where the axes of the rotation axes AX1, AX2, and AX3 extend is referred to as the vehicle width direction of the upper structure 21 as appropriate. A direction where the axis of the swing axis RX extends is referred to as the vertical direction of the upper structure 21 as appropriate. A direction orthogonal to both of the rotation axis AX1, AX2, or AX3 and the swing axis RX is referred to as the front-and-rear direction of the upper structure 21 as appropriate.

In the embodiment, a direction where the work equipment 10 including the bucket 13 is is the front with respect to the operator Ma seated in the driver's seat 7. An opposite direction to the front is the rear. One side of the vehicle width direction is the right. An opposite direction to the right, that is, the side where the cab 23 is, is the left. The bucket 13 is placed forward of the upper structure 21. The plurality of cutting edges 13B of the bucket 13 is placed in the vehicle width direction. The upper structure 21 is placed above the undercarriage 22.

The work equipment 10 operates by hydraulic cylinders. The excavator 3 includes a boom cylinder 14 for operating the boom 11, an arm cylinder 15 for operating the arm 12, and a bucket cylinder 16 for operating the bucket 13. When the boom cylinder 14 performs an extension/contraction operation, the boom 11 operates pivoting on the rotation axis AX1 to move a distal end of the boom 11 in the vertical direction. When the arm cylinder 15 performs the extension/contraction operation, the arm 12 operates pivoting on the rotation axis AX2 to move a distal end of the arm 12 in the vertical or front-and-rear direction. When the bucket cylinder 16 performs the extension/contraction operation, the bucket 13 operates pivoting on the rotation axis AX3 to move the cutting edges 13B of the bucket 13 in the vertical or front-and-rear direction. The hydraulic cylinders of the work equipment 10 including the boom cylinder 14, the arm cylinder 15, and the bucket cylinder 16 are operated by the operating levers of the operating device 8. The hydraulic cylinders of the work equipment 10 perform the extension/contraction operation to change the attitude of the work equipment 10.

<Operating Device>

Figure 4:
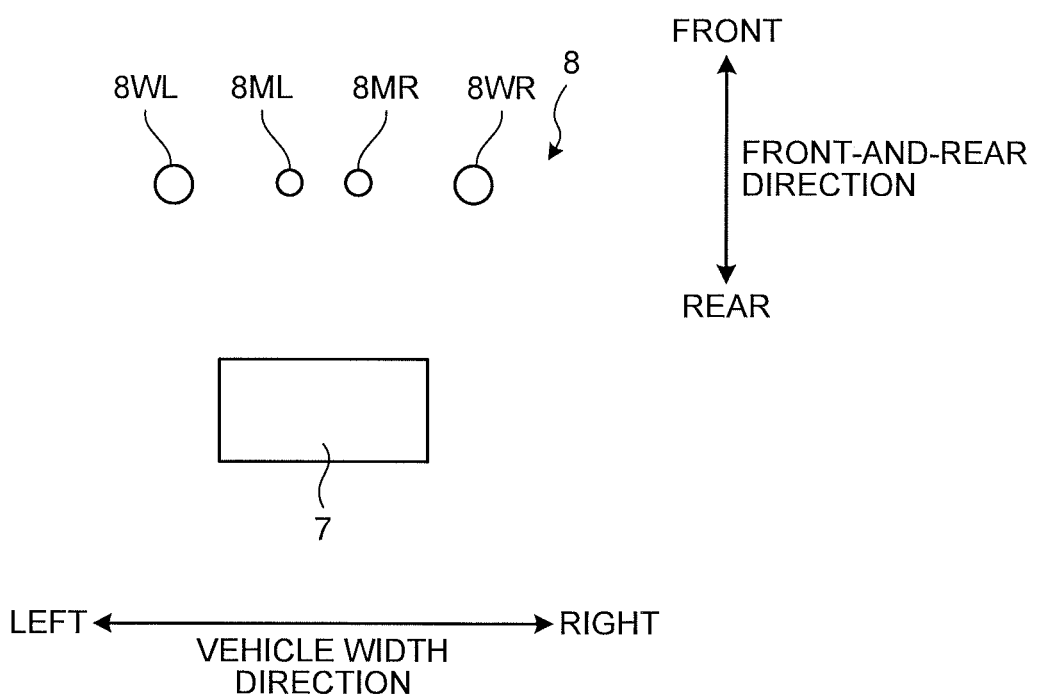
FIG. 4 is a diagram schematically illustrating an example of an operating device according to the embodiment.

Next, the operating device 8 according to the embodiment is described. FIG. 4 is a diagram schematically illustrating an example of the operating device 8 according to the embodiment. The operating levers of the operating device 8 include a right operating lever 8WR placed to the right of the center of the driver's seat 7 in the vehicle width direction, and a left operating lever 8WL placed to the left of the center of the driver's seat 7 in the vehicle width direction. The travel levers of the operating device 8 include a right travel lever 8MR placed to the right of the center of the driver's seat 7 in the vehicle width direction, and a left travel lever 8ML placed to the left of the center of the driver's seat 7 in the vehicle width direction.

When the right operating lever 8WR in the neutral position is tilted to the front, the boom 11 performs a lowering operation, and when tilted to the rear, the boom 11 performs a raising operation. When the right operating lever 8WR in the neutral position is tilted to the right, the bucket 13 performs a dumping operation, and when tilted to the left, the bucket 13 performs a raking operation.

When the left operating lever 8WL in the neutral position is tilted to the right, the upper structure 21 swings to the right, and when tilted to the left, the upper structure 21 swings to the left. When the left operating lever 8WL in the neutral position is tilted to the rear, the arm 12 performs the raking operation, and when tilted to the front, the arm 12 performs the extension operation.

When the right travel lever 8MR in the neutral position is tilted to the front, the right crawler 27 performs a forward travel operation, and when tilted to the rear, the right crawler 27 performs a backward travel operation. When the left travel lever 8ML in the neutral position is tilted to the front, the left crawler 27 performs the forward travel operation, and when tilted to the rear, the left crawler 27 performs the backward travel operation.

The operation patterns based on the operation relationship between the tilt directions of the right operating lever 8WR and the left operating lever 8WL and the swing directions of the work equipment 10 or the upper structure 21 may not have the above relationship.

<Hardware Configuration>

Figure 5:
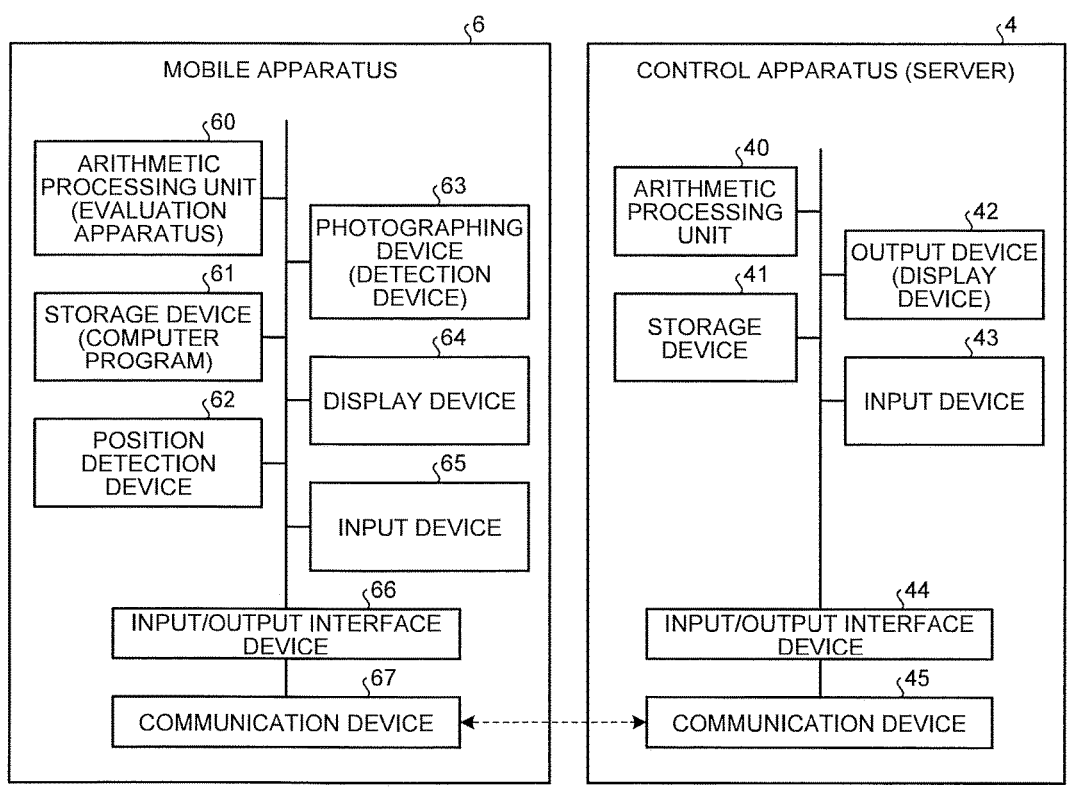
FIG. 5 is a diagram schematically illustrating an example of a hardware configuration of the evaluation system according to the embodiment.

Next, a hardware configuration of the evaluation system 1 according to the embodiment is described. FIG. 5 is a diagram schematically illustrating an example of the hardware configuration of the evaluation system 1 according to the embodiment.

The mobile apparatus 6 includes the computer system. The mobile apparatus 6 includes an arithmetic processing unit 60, a storage device 61, a position detection device 62 that detects the position of the mobile apparatus 6, a photographing device 63, a display device 64, an input device 65, an input/output interface device 66, and a communication device 67.

The arithmetic processing unit 60 includes a microprocessor such as a CPU (Central Processing Unit). The storage device 61 includes a memory such as a ROM (Read Only Memory) or RAM (Random Access Memory), and a storage. The arithmetic processing unit 60 carries out an operation in accordance with a computer program stored in the storage device 61.

The position detection device 62 detects an absolute position indicating the position of the mobile apparatus 6 in a global coordinate system through a global navigation satellite system (Global Navigation Satellite System: GNSS).

The photographing device 63 has a video camera function that can acquire video data of a subject, and a still camera function that can acquire still image data of the subject. The photographing device 63 includes an optical system and an imaging device that acquires photograph data of the subject via the optical system. The imaging device includes a CCD (Charge Coupled Device) image sensor, or CMOS (Complementary Metal Oxide Semiconductor) image sensor.

The photographing device 63 can photograph the excavator 3. The photographing device 63 functions as a detection device that detects operation data of the work equipment 10 of the excavator 3. The photographing device 63 can acquire photograph data of the work equipment 10, and acquire movement data of the work equipment 10 including at least one of the movement track, travel speed, and travel time of the work equipment 10. The photograph data of the work equipment 10 includes one or both of video data and still image data of the work equipment 10.

The display device 64 includes a flat panel display such as a liquid crystal display (Liquid Crystal Display: LCD) or an organic EL display (Organic Electroluminescence Display: OELD). The input device 65 is operated to generate input data. In the embodiment, the input device 65 includes a touch sensor provided to a display screen of the display device 64. The display device 64 includes a touchscreen.

The input/output interface device 66 performs data communication with the arithmetic processing unit 60, the storage device 61, the position detection device 62, the photographing device 63, the display device 64, the input device 65, and the communication device 67.

The communication device 67 performs wireless data communication with the control apparatus 4. The communication device 67 performs data communication with the control apparatus 4 through a mobile phone communication network or Internet line.

The control apparatus 4 includes the computer system. The control apparatus 4 includes an arithmetic processing unit 40, a storage device 41, an output device 42, an input device 43, an input/output interface device 44, and a communication device 45.

The arithmetic processing unit 40 includes a microprocessor such as a CPU. The storage device 41 includes a memory such as a ROM or RAM and a storage.

The output device 42 includes a display device such as a flat panel display. The output device 42 may include a printing device that outputs print data. The input device 43 is operated to generate input data. The input device 43 includes at least one of a keyboard and a mouse. The input device 43 may include a touch sensor provided to the display screen of the display device.

The input/output interface device 44 performs data communication with the arithmetic processing unit 40, the storage device 41, the output device 42, the input device 43, and the communication device 45.

The communication device 45 performs wireless data communication with the mobile apparatus 6. The communication device 45 performs data communication with the mobile apparatus 6 through a mobile phone communication network or Internet line.

<Mobile Apparatus>

Figure 6:
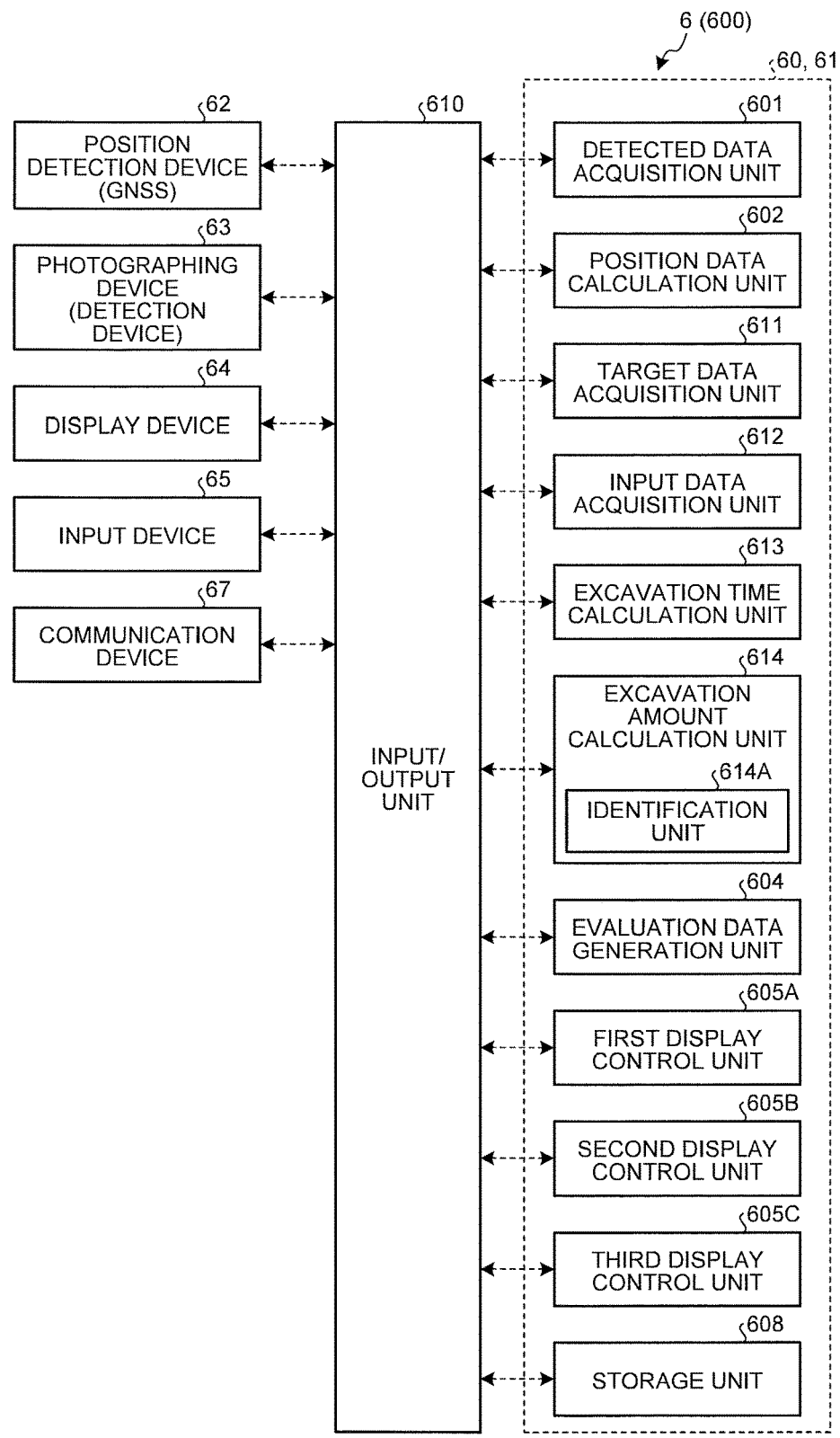
FIG. 6 is a function block diagram illustrating an example of a mobile apparatus according to the embodiment.

Next, the mobile apparatus 6 according to the embodiment is described. FIG. 6 is a function block diagram illustrating an example of the mobile apparatus 6 according to the embodiment. The mobile apparatus 6 functions as an evaluation apparatus 600 that makes one or both of an evaluation of the operation of the excavator 3, and an evaluation of the skill of the operator Ma who operates the excavator 3. The functions of the evaluation apparatus 600 are achieved by the arithmetic processing unit 60 and the storage device 61.

The evaluation apparatus 600 includes a detected data acquisition unit 601 that acquires photograph data photographed by the photographing device 63, a position data calculation unit 602 that calculates position data of the work equipment 10 based on the photograph data photographed by the photographing device 63, a target data acquisition unit 611 that acquires target data indicating a target excavation amount of the work equipment 10, an input data acquisition unit 612 that acquires input data generated by the operation of the input device 65, an excavation time calculation unit 613 that calculates the excavation time of one excavation operation by the bucket 13 based on the photograph data, an excavation amount calculation unit 614 that calculates excavation efficiency such as the excavation amount of the bucket 13 based on the photograph data, an evaluation data generation unit 604 that generates evaluation data of the operator Ma, a first display control unit 605A that causes the display screen of the display device 64 to display the photograph data, a second display control unit 605B that causes the display screen of the display device 64 to display a graphic representing at least part of the outline of the bucket 13, a third display control unit 605C that causes the display screen of the display device 64 to display a guideline whose dimensions and position are fixed, and a storage unit 608. The evaluation apparatus 600 performs data communication via an input/output unit 610.

The photographing device 63 photographs photograph data of the work equipment 10 operated by the operator Ma via the operating device 8.

The detected data acquisition unit 601 acquires the photograph data of the bucket 13 of the work equipment 10 photographed by the photographing device 63.

The position data acquisition unit 602 calculates position data of the work equipment 10 from the photograph data of the work equipment 10 photographed by the photographing device 63. The position data acquisition unit 602 uses, for example, pattern matching to calculate the position data of the work equipment 10 from the photograph data of the work equipment 10.

The target data acquisition unit 611 acquires target data indicating a target excavation amount of the bucket 13.

The input data acquisition unit 612 acquires input data generated by the operation of the input device 65. The input data includes specification data that specifies an opening end of the bucket 13.

The excavation time calculation unit 613 performs image processing on the photograph data of the bucket 13 photographed by the photographing device 63, and calculates the excavation time of one excavation operation of the bucket 13.

The excavation amount calculation unit 614 performs image processing on the photograph data of the bucket 13 photographed by the photographing device 63. In the embodiment, the excavation amount calculation unit 614 calculates excavation efficiency in the excavation operation of the bucket 13. The excavation amount calculation unit 614 calculates excavation efficiency such as the excavation amount and fill factor of the bucket 13 from the area of excavated material above the opening end of the bucket 13.

The excavation amount calculation unit 614 includes an identification unit 614A that performs image processing on the photograph data of the bucket 13 photographed by the photographing device 63 and distinguishes the bucket 13 from the excavated material above the opening end of the bucket 13.

The evaluation data generation unit 604 generates evaluation data of the operator Ma based on first detected data indicating the excavation amount of the bucket 13 calculated by the excavation amount calculation unit 614, and second detected data indicating the excavation time of the bucket 13 calculated by the excavation time calculation unit 613. The first detected data may otherwise indicate the fill factor described below, together with the excavation amount, instead of the excavation amount. Moreover, the evaluation data generation unit 604 generates the evaluation data of the operator Ma based on a difference between the first detected data calculated by the excavation amount calculation unit 614 and the target data acquired by the target data acquisition unit 611.

The first display control unit 605A generates display data from the photograph data of the excavator 3 photographed by the photographing device 63, and causes the display screen of the display device 64 to display the display data. Moreover, the first display control unit 605A generates display data from the evaluation data, and causes the display device 64 to display the display data.

The second display control unit 605B causes the display screen of the display device 64 to display a graphic representing at least part of the outline of the bucket 13 as viewed from the side. The second display control unit 605B moves the graphic on the display screen of the display device 64 by the operation of the input device 65. The dimensions of the graphic that are displayed on the display screen of the display device 64 by the second display control unit 605B are fixed.

The third display control unit 605C causes the display screen of the display device 64 to display the guideline whose dimensions and position are fixed on the display screen of the display device 64. The third display control unit 605C causes the display screen of the display device 64 to display the guideline based on work vehicle data including the dimensions of the excavator 3 and the range of motion of the work equipment 10.

The storage unit 608 stores various kinds of data. In the embodiment, the storage unit 608 holds the work vehicle data including the dimensions of the excavator 3 and the range of motion of the work equipment 10. Moreover, the storage unit 608 stores a computer program for executing an evaluation method according to the embodiment.

<Evaluation Method>

Figure 7:
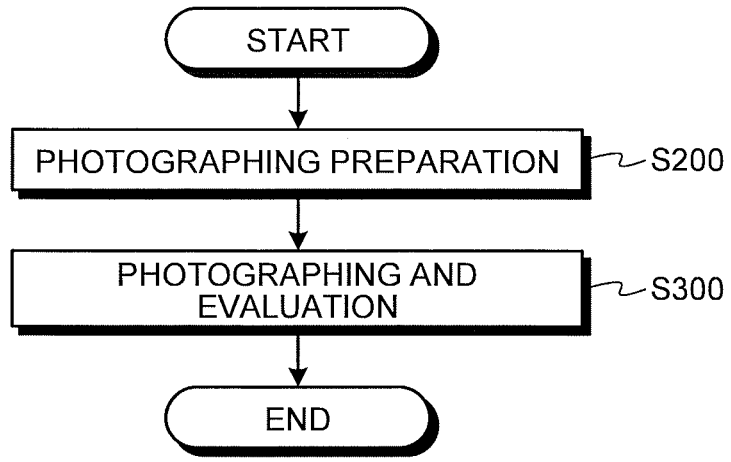
FIG. 7 is a flowchart illustrating an example of an evaluation method according to the embodiment.

Next, a method for evaluating the operator Ma according to the embodiment is described. FIG. 7 is a flowchart illustrating an example of the evaluation method according to the embodiment.

In the embodiment, the evaluation method includes a step of preparing for the photographing of the excavator 3 by the photographing device 63 (S200), and a step of photographing the excavator 3 with the photographing device 63 and evaluating the operator Ma (S300).

<Photographing Preparation>

Figure 8:
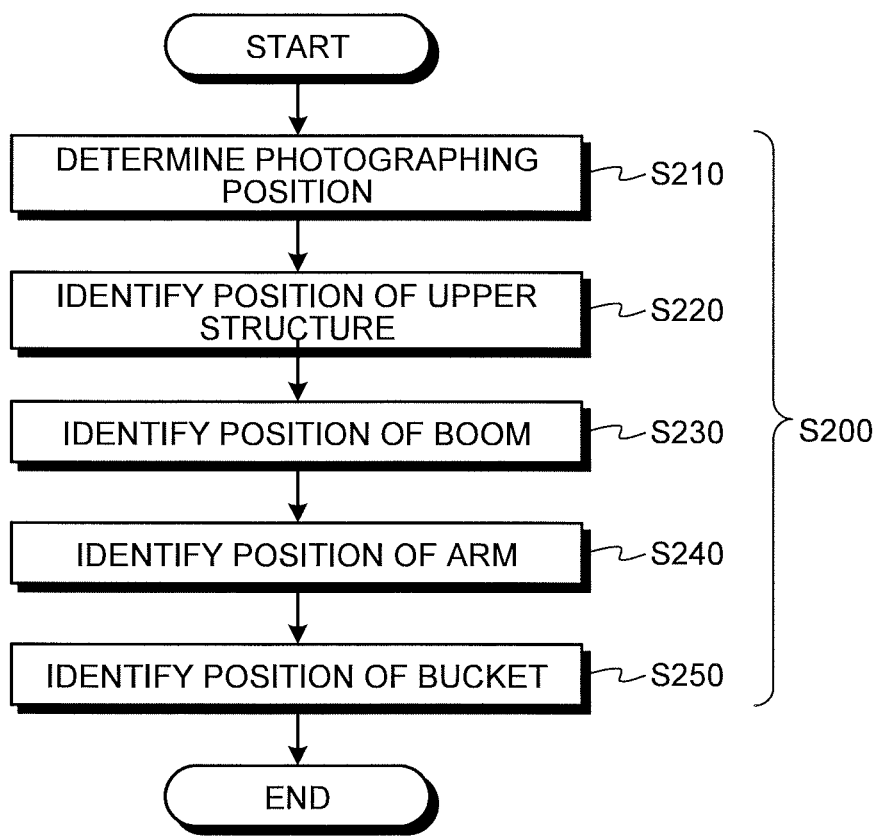
FIG. 8 is a flowchart illustrating an example of a photographing preparation method according to the embodiment.

After the personal data of the operator Ma is registered, the preparation is made for the photographing of the excavator 3 by the photographing device 63 (step S200). FIG. 8 is a flowchart illustrating an example of a photographing preparation method according to the embodiment.

In the embodiment, the photographing preparation method includes a step of determining the photographing position of the photographing device 63 with respect to the excavator 3 (S210), a step of identifying the position of the upper structure 21 (S220), a step of identifying the position of the boom 11 (S230), a step of identifying the position of the arm 12 (S240), and a step of identifying the position of the bucket 13 (S250).

In order to make the photographing condition of the excavator 3 the same, the process of determining the relative position between the excavator 3 and the photographing device 63 that photographs the excavator 3 is performed (step S210).

Figure 9:
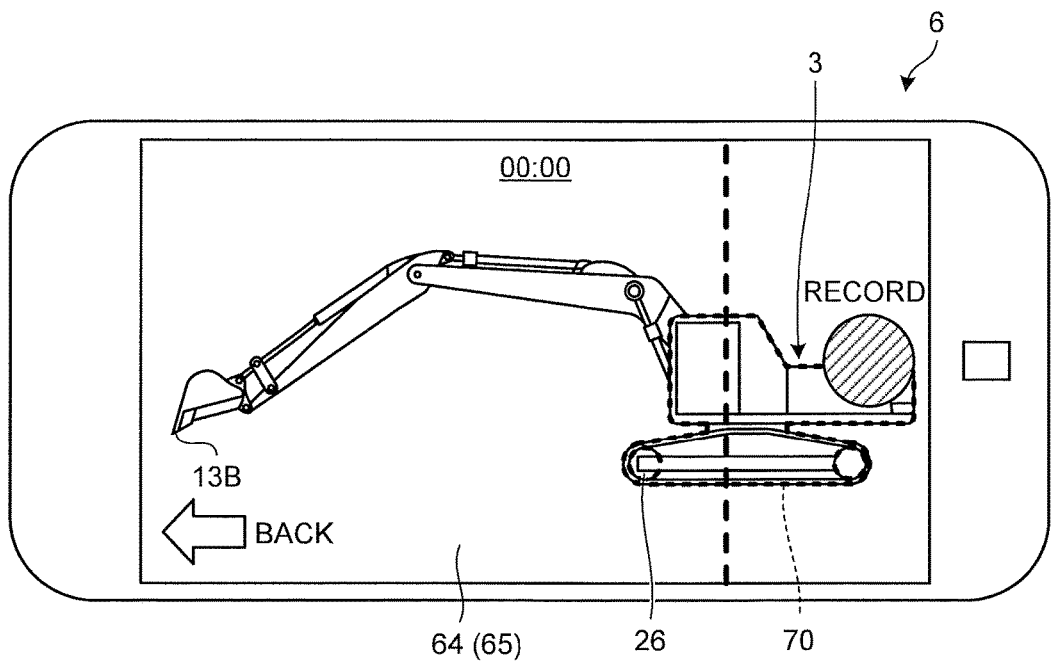
FIG. 9 is a diagram for explaining an example of a method for determining a photographing position according to the embodiment.

FIG. 9 is a diagram for explaining an example of a method for determining the photographing position according to the embodiment. The operator Ma or worker Mb operates the input device 65 of the mobile apparatus 6 to start the computer program stored in the storage unit 608. The start of the computer program causes the mobile apparatus 6 to transition to photographing preparation mode. As illustrated in FIG. 9, in photographing preparation mode, the third display control unit 605C causes the display screen of the display device 64 to display a guideline 70 whose dimensions and position are fixed on the display screen of the display device 64 based on the work vehicle data.

Moreover, in photographing preparation mode, a zoom function of the optical system of the photographing device 63 is restricted. The excavator 3 is photographed by the photographing device 63 with a fixed specified magnification. The position of the photographing device 63 where the outline of the base machine 20 coincides with the guideline 70 on the display screen of the display device 64 is determined as the photographing position.

After the photographing position is determined, the process of identifying the position of the upper structure 21 is performed (step S220). The position data calculation unit 602 uses pattern matching to identify the position of the upper structure 21.

Figure 10:
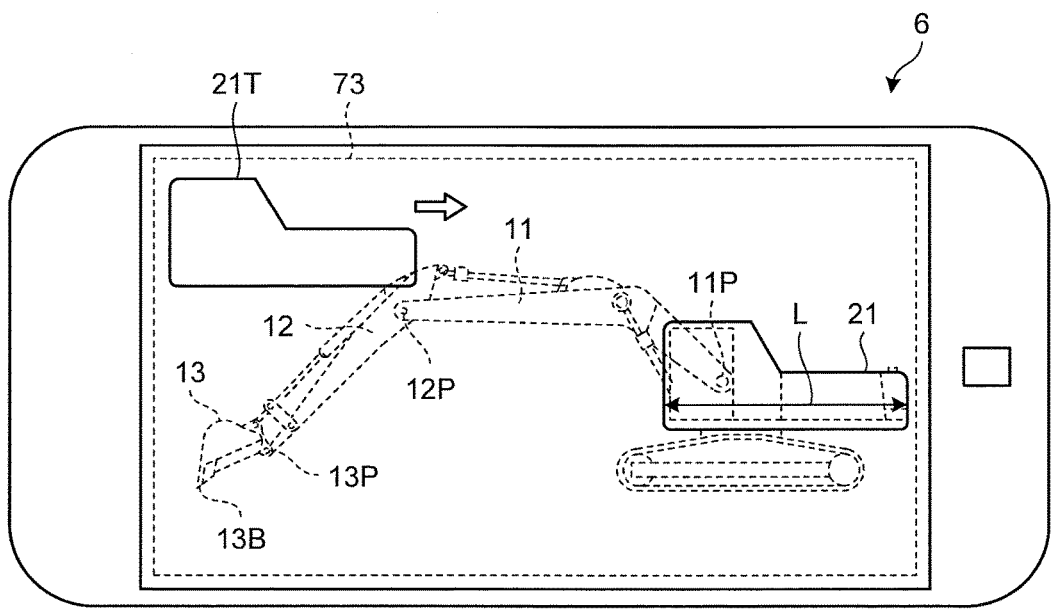
FIG. 10 is a diagram for explaining a method for identifying the position of an upper structure according to the embodiment.

FIG. 10 is a diagram for explaining a method for identifying the position of the upper structure 21 according to the embodiment. As illustrated in FIG. 10, the photographing device 63 acquires photograph data of a search area 73 including the excavator 3. The position data calculation unit 602 calculates position data of the work equipment 10 based on the photograph data of the search area 73 photographed by the photographing device 63. The position data calculation unit 602 moves an upper structure template 21T being a template of the upper structure 21, scanning the search area 73, on the display screen of the display device 62 to calculate position data of the base machine 20. The position data calculation unit 602 calculates the position data of the base machine 20 based on a correlation value between photograph data of the base machine 20 and the upper structure template 21T.

The calculation of the position data of the base machine 20 enables the identification of the position of the upper structure 21. The identification of the position of the upper structure 21 enables the identification of the position of the boom pin 11P.

Moreover, the position data calculation unit 602 calculates dimensional data indicating the dimension of the base machine 20 based on the photograph data of the search area 73. In the embodiment, the position data calculation unit 602 calculates a dimension L in the front-and-rear direction of the upper structure 21 as viewed from the left side on the display screen of the display device 64.

After the position data of the upper structure 21 is calculated, the process of identifying the position of the boom 11 is performed (step S230). The position data calculation unit 602 moves a boom template 11T being a template of the boom 11 over the search area 73 on the display screen of the display device 64, and calculates position data of the boom 11. The position data calculation unit 602 calculates the position data of the boom 11 based on a correlation value between photograph data of the boom 11 and the boom template 11T.

Figure 11:
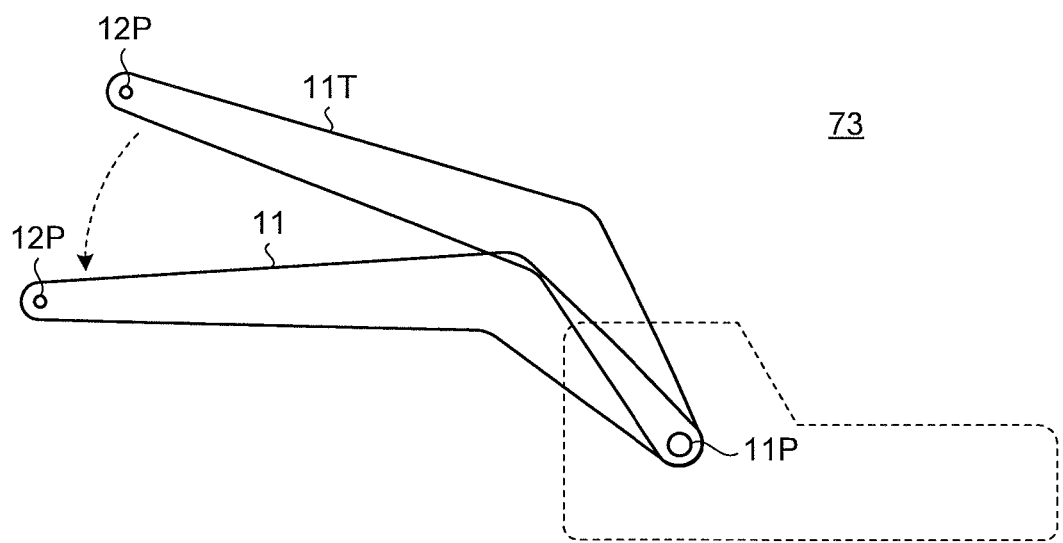
FIG. 11 is a diagram for explaining a method for identifying the position of work equipment according to the embodiment.

FIG. 11 is a diagram for explaining a method for identifying the position of the boom 11 according to the embodiment. The boom 11 can rotate about the rotation axis AX1 with respect to the upper structure 21. Hence, the boom template 11T may not coincide with the photograph data of the boom 11 depending on the angle of the boom 11 in the direction of rotation about the rotation axis AX1 if the boom template 11T is simply moved scanning the search area 73.

Figure 13:
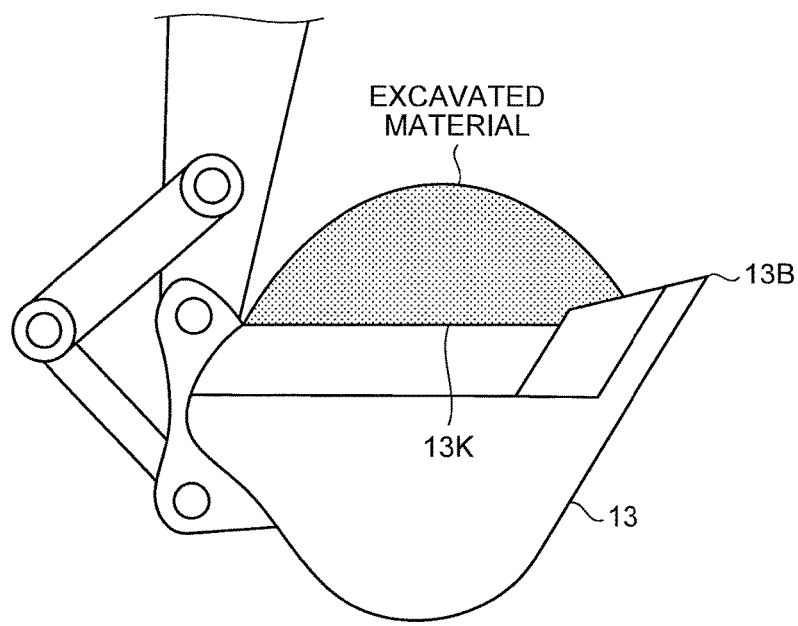
FIG. 13 is a diagram for explaining an example of a method for calculating an excavation amount according to the embodiment.

As described above, the identification of the position of the upper structure 21 enables the identification of the position of the boom pin 11P. In the embodiment, as illustrated in FIG. 13, the position data calculation unit 602 causes the position of a boom pin of the boom template 11T to coincide with the position of the boom pin 11P of the boom 11, which was identified in step S220, on the display screen of the display device 64. After causing the position of the boom pin of the boom template 11T to coincide with the position of the boom pin 11P of the boom 11, the position data calculation unit 602 rotates and moves the boom template 11T such that the boom template 11T coincides with the boom 11 on the display screen of the display device 64, and calculates the position data of the boom 11. The position data calculation unit 602 calculates the position data of the boom 11 based on the correlation value between the photograph data of the boom 11 and the boom template 11T.

The calculation of the position data of the boom 11 enables the identification of the position of the boom 11. The identification of the position of the boom 11 enables of the identification of the position of the arm pin 12P.

After the position of the boom 11 is calculated, the process of identifying the position of the arm 12 is performed (step S240). The position data calculation unit 602 moves an arm template being a template of the arm 12 over the search area 73 on the display screen of the display device 64 to calculate position data of the arm 12. The position data calculation unit 602 calculates the position data of the arm 12 based on a correlation value between photograph data of the arm 12 and the arm template.

The arm 12 can rotate about the rotation axis AX2 with respect to the boom 11. Hence, the arm template may not coincide with the photograph data of the arm 12 depending on the angle of the arm 12 in the direction of rotation about the rotation axis AX2 if the arm template is simply moved scanning the search area 73.

As described above, the identification of the position of the boom 11 enables the identification of the position of the arm pin 12P. In the embodiment, the position data calculation unit 602 identifies the position of the arm 12 in a similar procedure to the procedure that identifies the position of the boom 11. The position data calculation unit 602 causes an arm pin of the arm template to coincide in position with the arm pin 12P of the arm 12, which was identified in step S230, on the display screen of the display device 64. After causing the position of the arm pin of the arm template to coincide with the position of the arm pin 12P of the arm 12, the position data calculation unit 602 rotates and moves the arm template such that the arm template coincides with the arm 12 on the display screen of the display device 64 to calculate the position data of the arm 12. The position data calculation unit 602 calculates the position data of the arm 12 based on the correlation value between the photograph data of the arm 12 and the arm template.

The calculation of the position data of the arm 12 enables the identification of the position of the arm 12. The identification of the position of the arm 12 enables the identification of the position of the bucket pin 13P.

After the position of the arm 12 is calculated, the process of identifying the position of the bucket 13 is performed (step S250). The position data calculation unit 602 moves a bucket template being a template of the bucket 13 over the search area 73 on the display screen of the display device 64, and calculates position data of the bucket 13. The position data calculation unit 602 calculates position data of the bucket 13 based on a correlation value between photograph data of the bucket 13 and the bucket template.

The bucket 13 can rotate about the rotation axis AX3 with respect to the arm 12. Hence, the bucket template may not coincide with the photograph data of the bucket 13 depending on the angle of the bucket 13 in the direction of rotation about the rotation axis AX3 if the bucket template is simply moved scanning the search area 73.

As described above, the identification of the position of the arm 12 enables the identification of the position of the bucket pin 13P. In the embodiment, the position data calculation unit 602 identifies the position of the bucket 13 in a similar procedure to the procedure that identifies the position of the boom 11 and to the procedure that identifies the position of the arm 12. The position data calculation unit 602 causes a bucket pin of the bucket template to coincide in position with the bucket pin 13P of the bucket 13, which was identified in step S240, on the display screen of the display device 64. After causing the position of the bucket pin of the bucket template to coincide with the position of the bucket pin 13P of the bucket 13, the position data calculation unit 602 rotates and moves the bucket template such that the bucket template coincides with the bucket 13 on the display screen of the display device 64, and calculates the position data of the bucket 13. The position data calculation unit 602 calculates the position data of the bucket 13 based on the correlation value between the photograph data of the bucket 13 and the bucket template.

The calculation of the position data of the bucket 13 enables the identification of the position of the bucket 13. The identification of the position of the bucket 13 enables the identification of the position of the cutting edges 13B of the bucket 13.

<Photographing and Evaluation>

If the position of the work equipment 10 is identified, the mobile apparatus 6 transitions to photographing and evaluation mode. Also in photographing and evaluation mode, the zoom function of the optical system of the photographing device 63 is restricted. The excavator 3 is photographed by the photographing device 63 with a fixed specified magnification. The specified magnification in photographing preparation mode and the specified magnification in photographing and evaluation mode are the same.

Figure 12:
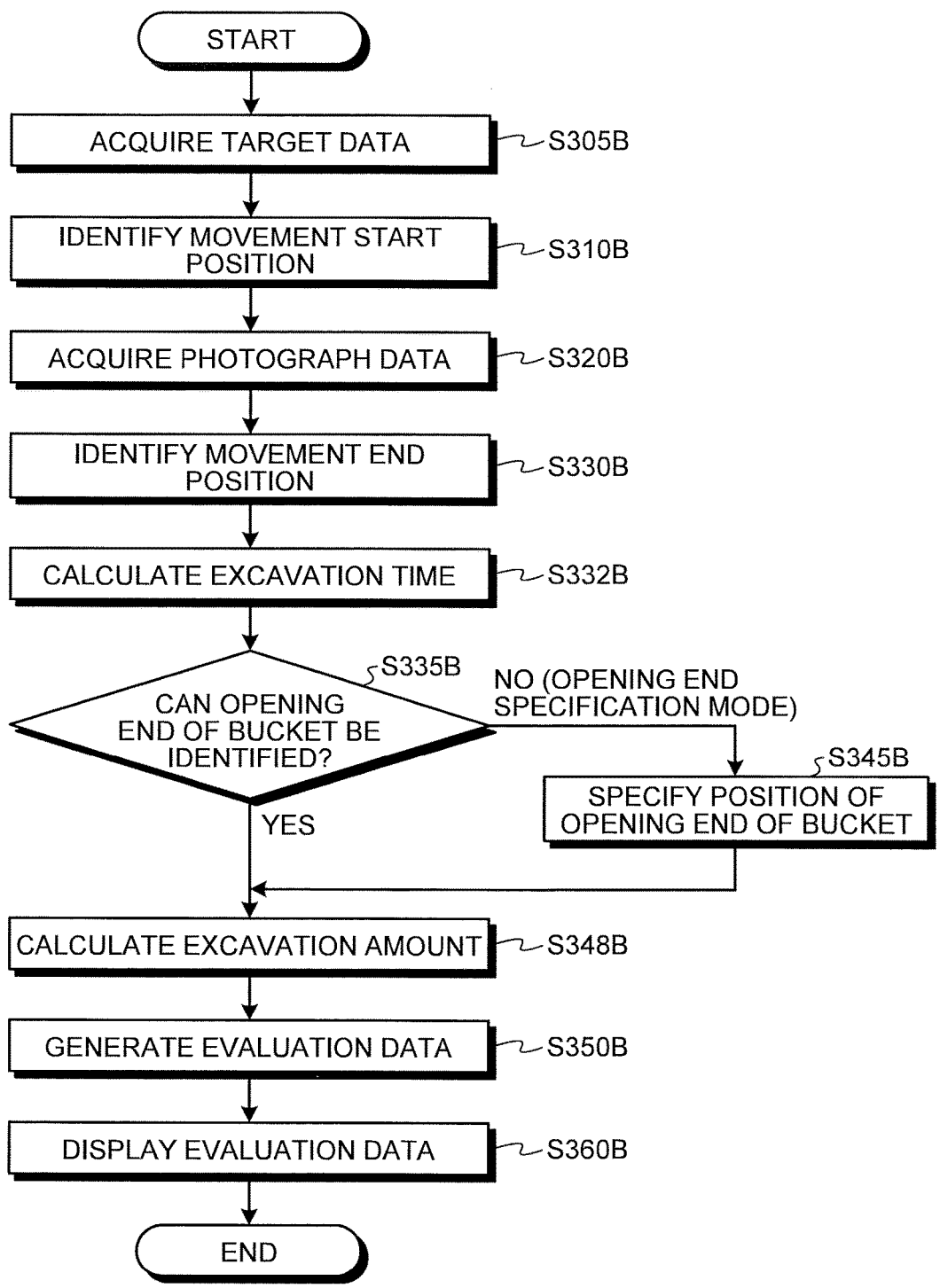
FIG. 12 is a flowchart illustrating an example of the evaluation method according to the embodiment.

FIG. 12 is a flowchart illustrating an example of a photographing and evaluation method according to the embodiment. The photographing and evaluation method according to the embodiment includes a step of acquiring target data indicating a target excavation amount of the work equipment 10 (S305B), a step of identifying a movement start position of the work equipment 10 (S310B), a step of acquiring photograph data of the moving work equipment 10 (S320B), a step of identifying a movement end position of the work equipment 10 (S330B), a step of calculating excavation time of the bucket 13 (S332B), a step of judging whether or not the opening end of the bucket 13 can be identified based on photograph data of the bucket 13 photographed by the photographing device 63 (S335B), a step of specifying the position of the opening end of the bucket 13 if the opening end of the bucket 13 cannot be identified based on the photograph data (S345B), a step of calculating an excavation amount of the bucket 13 (S348B), a step of generating evaluation data of the operator Ma (S350B), and a step of displaying the evaluation data on the display device 64 (S360B).

The process of acquiring target data indicating a target excavation amount of the work equipment 10 is performed (step S305S). The operator Ma declares a target excavation amount that he/she plans to achieve, and inputs the target excavation amount into the evaluation apparatus 600 via the input device 65. The target data acquisition unit 611 acquires target data indicating the target excavation amount of the bucket 13.

The target excavation amount may be specified by the soil volume of excavated material as the excavation amount, or may be specified by the fill factor with reference to a state where excavated material of a specified capacity protrudes from the opening end of the bucket 13. In other words, the operator Ma declares excavation efficiency in excavation work that is performed by himself/herself. In the embodiment, it is assumed that the target excavation amount is specified by the fill factor. The fill factor is a kind of heaped capacity. In the embodiment, a fill factor of 1.0 is assumed to be a state where 0.8 [m$^3$] of excavated material is scooped in the bucket 13 when the excavated material is heaped with a gradient of 1:1 above the opening end (upper edge) of the bucket 13.

Next, the process of identifying a movement start position and movement start time of the bucket 13 of the work equipment 10 is performed (step S310B).

In the embodiment, the movement start position of the bucket 13 is freely determined by the operator Ma. In the embodiment, a position where a period of time during which the cutting edges 13B of the bucket 13 are at rest is equal to or more than a specified period of time and the bucket 13 at rest starts moving is determined as the movement start position. Moreover, a point in time when the bucket 13 at rest starts moving is determined as the movement start time. In other words, the position where the bucket 13 at rest starts moving is the movement start position, and the point in time when the bucket 13 starts moving is the movement start time.

If having judged, based on the photograph data of the photographing device 63, that the period of time during which the bucket 13 is at rest is equal to or more than the specified period of time, the position data calculation unit 602 determines the position of the bucket 13 as the movement start position of the bucket 13.

When the bucket 13 at rest starts moving by the operation of the operator Ma, the position data calculation unit 602 detects that the bucket 13 has started moving based on the photograph data. The position data calculation unit 602 determines the point in time when the bucket 13 at rest started moving as the movement start time of the bucket 13.

When the bucket 13 has started moving, the process of acquiring operation data of the bucket 13 is performed (step S320B). The operation data of the bucket 10 includes photograph data of the bucket 13 from when the work equipment 10 at rest starts moving at the movement start position and performs an excavation operation to when the excavation operation ends and the movement ends at a movement end position.

When the bucket 13 on the move has stopped moving by the operation of the operator Ma, the process of identifying a movement end position and movement end time of the bucket 13 of the work equipment 10 is performed (step S330B).

In the embodiment, the movement end position of the bucket 13 is freely determined by the operator Ma. In the embodiment, the position of the bucket 13 where it is judged that the cutting edges 13B of the bucket 13 on the move stop moving and a period of time during which the movement is stopped is equal to or more than a specified period of time is determined as the movement end position. Moreover, a point in time when the movement ends is determined as the movement end time. In other words, the position where the bucket 13 on the move stops is the movement end position, and the point in time when the bucket 13 on the move stops is the movement end time.

When the bucket 13 on the move has stopped moving by the operation of the operator Ma, the position data calculation unit 602 detects that the bucket 13 has stopped moving based on photograph data. The position data calculation unit 602 determines the position where the bucket 13 on the move stopped moving as the movement end position of the bucket 13. Moreover, the position data calculation unit 602 determines the point in time when the bucket 13 on the move stopped moving is determined as the movement end time of the bucket 13. If having judged that the bucket 13 on the move stopped moving and the period of time during which the bucket 13 is at rest is equal to or more than the specified period of time, the position data calculation unit 602 determines the position of the bucket 13 as the movement end position of the bucket 13.

The excavation time calculation unit 613 calculates excavation time based on the photograph data (step S332B). The excavation time is a period of time from the movement start time to the movement end time of the bucket 13.

Next, the excavation amount calculation unit 614 judges whether an opening end 13K of the bucket 13 can be identified based on photograph data of the bucket 13 photographed by the photographing device 63 (S335B).

FIG. 13 is a diagram for explaining an example of a method for calculating an excavation amount according to the embodiment. FIG. 13 illustrates a state of the bucket 13 as viewed from the left side when the excavation operation ends. As illustrated in FIG. 13, the end of the excavation operation allows the bucket 13 to hold the excavated material. If more excavated material is scooped by the excavation operation, the excavated material protrudes upward from the opening end 13K of the bucket 13 as viewed from the side as illustrated in FIG. 13. If the excavation does not allow the bucket 13 to be filled to inner capacity in the excavation operation, the excavated material does not protrude upward from the opening end 13K of the bucket 13 even when viewed from the side. The excavation amount calculation unit 614 performs image processing on photograph data of the bucket 13 photographed from the left side by the photographing device 63, and identifies the opening end 13K of the bucket 13 being a boundary between the bucket 13 and the excavated material. The excavation amount calculation unit 614 can identify the opening end 13K of the bucket 13 based on contrast data including at least one of the differences in brightness, lightness, and chromaticity between the bucket 13 and the excavated material.

On the other hand, the surface of the bucket 13 may become dirty due to contact with the excavated material, and a coating applied on the surface of the bucket 13 may come off. Therefore, clear contrast data between the bucket 13 and the excavated material may not be able to be obtained. As a result, the boundary between the bucket 13 and the excavated material may become unclear and it may become difficult for the excavation amount calculation unit 614 to identify the opening end 13K of the bucket 13 from the photograph data of the photographing device 63.

Hence, the excavation amount calculation unit 614 judges whether or not the opening end 13K of the bucket 13 can be identified based on the photograph data of the bucket 13 photographed by the photographing device 63 (step S335B).

If having judged in step S335B that the opening end 13K of the bucket 13 can be identified (step S335: Yes), the excavation amount calculation unit 614 identifies the position of the opening end 13K of the bucket 13, performs image processing on the photograph data of the bucket 13 photographed by the photographing device 63, and calculates the area of the excavated material above the opening end 13K of the bucket 13.

The excavation amount calculation unit 614 calculates the excavation amount in the excavation operation of the bucket 13 from the area of the excavated material above the opening end 13K. The excavation amount of the bucket 13 is roughly estimated from the area of the excavated material above the opening end 13K (step S348B). A specific method for calculating the excavation amount based on the area of the excavated material is described below. When the area of the excavated material is obtained, the excavation amount can be estimated as follows: for example, the width of the bucket 13 (a perpendicular direction of the bucket 13 illustrated in FIG. 13 with respect to the paper surface) is stored in advance in the storage unit 608, or the width of the bucket 13 is input from the input device 65. The area of the excavated material above the opening end 13K and the width of the bucket 13 are multiplied. Accordingly, the soil volume of the excavated material above the opening end 13K can be obtained. The magnitude of the area of the excavated material above the opening end 13K may be simply used as the magnitude of the excavation amount.

If it has been judged in step S335B that the opening end 13K of the bucket 13 cannot be identified (step S335: No), the mobile apparatus 6 transitions to opening end specification mode.

Figure 14:
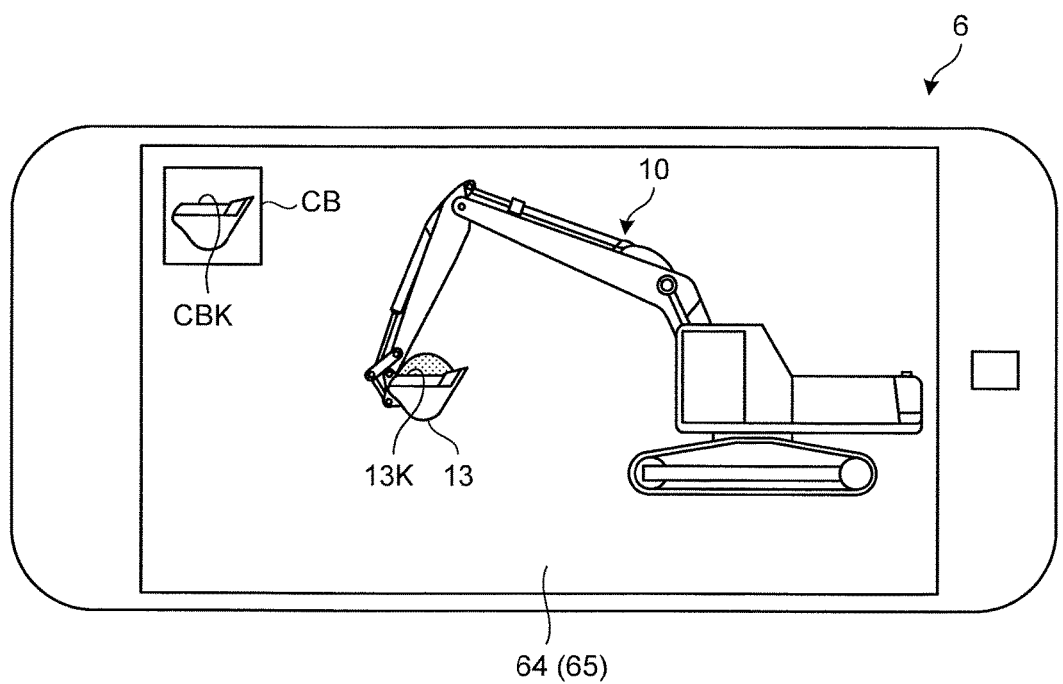
FIG. 14 is a diagram schematically illustrating an example of a method for specifying an opening end according to the embodiment.
Figure 15:
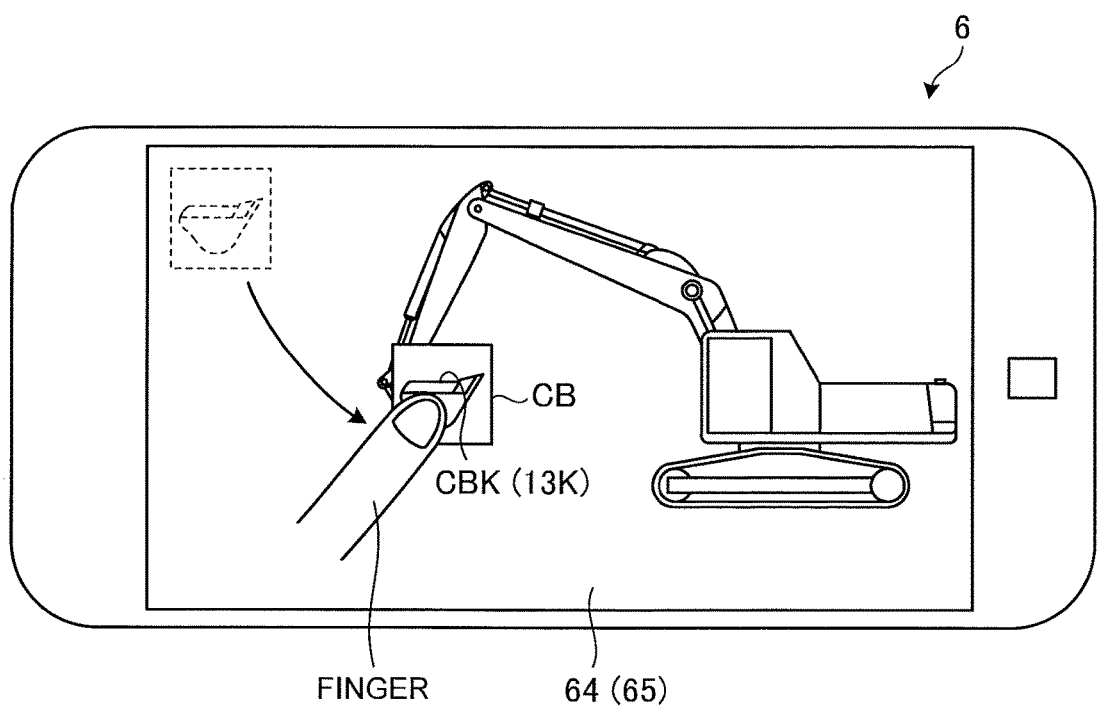
FIG. 15 is a diagram schematically illustrating an example of the method for specifying an opening end according to the embodiment.

FIGS. 14 and 15 are diagrams schematically illustrating an example of a method for specifying the opening end 13K according to the embodiment. When the transition to opening end specification mode has occurred, the first display control unit 605A causes the display screen of the display device 64 to display photograph data of the excavator 3 including the bucket 13 as illustrated in FIG. 14. Moreover, the second display control unit 605B causes the display screen of the display device 64 to display a graphic representing at least part of the outline of the bucket 13.

As illustrated in FIG. 14, in the embodiment, the graphic representing at least part of the outline of the bucket 13 is an icon CB mimicking the bucket 13. The icon CB includes a line CBK indicating the opening end 13K of the bucket 13. The icon CB represents the outline of the bucket 13 as viewed from the left side. The shape and dimensions of the icon CB are fixed. The icon CB is displayed in a peripheral area of the display screen of the display device 64.

The worker Mb uses the icon CB to specify the position of the opening end 13K of the bucket 13 (step S345B). Specifically, as illustrated in FIG. 15, the worker Mb operates the display screen of the display device 64 where the input device 65 including the touch sensor is placed, and moves the icon CB on the display screen. The worker Mb slides and moves the finger to the left, right, up, or down while pressing the icon CB with the finger. The worker Mb slides and moves the icon CB such that the line CBK of the icon CB displayed on the display screen of the display device 64 by the second display control unit 605B is aligned on the display screen with the opening end 13K of the bucket 13 displayed on the display screen of the display device 64 by the first display control unit 605A.

The second display control unit 605B moves the icon CB being the graphic on the display screen of the display device 64 based on the operation of the input device 65. The line CBK of the icon CB is aligned with the opening end 13K of the bucket 13 on the display screen of the display device 64, and accordingly the position of the opening end 13K of the bucket 13 is specified.

The display screen of the display device 64 includes a plurality of pixels. An address is assigned to each of the plurality of pixels. The icon CB is specified on the display screen of the display device 64 so that the position data calculation unit 602 can identify the position of the bucket 13 based on the position of the icon CB and the addresses of pixels.

The identification unit 614A performs image processing on the photograph data of the bucket 13 to distinguish the bucket 13 on the display screen of the display device 64 from the extracted material above the opening end 13K of the bucket 13 based on the line CBK of the icon CB aligned with the opening end 13K of the bucket 13. The identification unit 614A included in the excavation amount calculation unit 614 distinguishes the bucket 13 from the excavated material above the opening end 13K of the bucket 13, and calculates the area of the excavated material above the opening end 13K (step S348B). For example, the area of the excavated material above the opening end 13K is calculated based on the number of pixels that display the excavated material. Consequently, the excavation amount calculation unit 614 can calculate the excavation amount of the bucket 13 (step S348B).

In this manner, the position of the upper structure 21, the position of the boom 11, and the position of the arm 12 are sequentially identified by pattern matching in the embodiment as described with reference to the flowchart of FIG. 8. If the position of the bucket 13 cannot be identified based on image processing, including pattern matching, on the photograph data after the position of the arm 12 is identified, the position data calculation unit 602 can calculate the position of the bucket 13 with respect to the upper structure 21 based on the icon CB aligned with the bucket 13 on the display screen of the display device 64.

Moreover, in the embodiment, as described with reference to FIG. 9, the photographing position is determined using the guideline 70 such that the photographing device 63 is a specified distance away from the excavator 3. The excavation amount calculation unit 614 calculates the excavation amount of the bucket 13 based on the icon CB aligned with the bucket 13 photographed by the photographing device 63 that is the specified distance away from the excavator 3.

The evaluation data generation unit 604 generates the evaluation data of the operator Ma based on the first detected data indicating the excavation amount of the bucket 13 calculated in step S348B, and the second detected data indicating the excavation time of the bucket 13 calculated in step S332B.

The evaluation data generation unit 604 generates the evaluation data of the operator Ma based on a difference between the first detected data indicating the excavation amount of the bucket 13, and the target data indicating the target excavation amount of the bucket 13 acquired in step S305B. The smaller the difference between the first detected data and the target data is, the better the skill of the operator Ma is evaluated. On the other hand, the larger the difference between the first detected data and the target data is, the poorer the skill of the operator Ma is evaluated. Moreover, the shorter the excavation time is, the higher the skill of the operator Ma is determined. The longer the excavation time is, the lower the skill of the operator Ma is determined.

After the evaluation data is generated, the process of causing the display device 64 to display the evaluation data is performed (step S360B). The first display control unit 605A generates display data from the evaluation data, and causes the display device 64 to display the display data. In terms of the evaluation data, the evaluation data may be transmitted and output by wire or wireless, not to the display device 64 provided to the mobile apparatus 6, but to another display device, a printing device, or the like. The first display control unit 605A causes the display device 64 to display, for example, the name of the operator Ma being the personal data. Moreover, the first display control unit 605A causes the display device 64 to display, as the evaluation data, items of "excavation time" indicating the travel time of the bucket 13 from the movement start position to the movement end position, and "difference in excavation amount" indicating the difference between the target excavation amount and the actual excavation amount. Moreover, the first display control unit 605A causes the display device 64 to display, as the evaluation data, numerical data of the items of "excavation time" and "difference in excavation amount." Moreover, the first display control unit 605A causes the display device 64 to display the score of the skill of the operator Ma as the evaluation data. Reference data on the skill is stored in the storage unit 608. The reference data is, for example, evaluation data of an operator having a standard skill, and is obtained statistically or empirically. The score of the skill of the operator Ma is calculated with reference to the reference data.

<Operation and Effect>

As described above, according to the embodiment, the operator Ma is caused to actually perform the excavation operation for the evaluation of the operator Ma. The first detected data indicating the excavation amount of the work equipment 10 and the second detected data indicating the excavation time of the work equipment 10 are acquired. The evaluation data of the operator Ma is generated based on the first detected data and the second detected data. Accordingly, the skill of the operator Ma related to the actual excavation operation can be evaluated. Moreover, the skill of the operator Ma of the excavator 3 is evaluated objectively and quantitatively, and the evaluation data is provided. Accordingly, the motivation of the operator Ma to improve his/her skill is improved. Moreover, the operator Ma can improve his/her operation based on the evaluation data.

Moreover, according to the embodiment, the evaluation apparatus 600 includes the input data acquisition unit 612 that acquires the input data generated by the operation of the input device 65. As described above, the surface of the bucket 13 is highly likely to become dirty from the excavated material. Accordingly, clear contrast data may not be able to be obtained so that the opening end 13K may not be able to be identified from the photograph data of the bucket 13 photographed by the photographing device 63. Moreover, also if the coating on the surface of the bucket 13 comes off, clear contrast data may not be able to be obtained. Moreover, also if the background of the bucket 13 to be photographed is an earth heap, clear contrast data may not be able to be obtained. If the opening end 13K cannot be identified from the photograph data, the specification data that specifies the opening end 13K of the bucket 13 is input as the input data. Accordingly, the bucket 13 can be distinguished from excavated material above the opening end 13K of the bucket 13. Since the bucket 13 can be distinguished from the excavated material above the opening end 13K of the bucket 13, the excavation amount calculation unit 614 including the identification unit 614A can calculate the area of the excavated material above the opening end 13K based on the specification data, and calculate the excavation amount of the bucket 13.

Moreover, according to the embodiment, the evaluation apparatus 600 includes the first display control unit 605A that causes the display screen of the display device 64 to display the photograph data of the bucket 13, and the second display control unit 605B that causes the display screen of the display device 64 to display the icon CB representing the outline of the bucket 13. Hence, the worker Mb or the operator Ma can specify the opening end 13K of the bucket 13 simply by operating the input device 65, moving the icon CB, and aligning the line CBK of the icon CB with the opening end 13K of the bucket 13 displayed on the display screen of the display device 64. The second display control unit 605B moves the icon CB on the display screen of the display device 64 based on the operation of the input device 65. The excavation amount calculation unit 614 can identify the position of the opening end 13K by the alignment of the line CBK of the icon CB and the photograph data of the opening end 13K of the bucket 13 on the display screen of the display device 64. The identification unit 614A of the excavation amount calculation unit 614 can distinguish the bucket 13 from the excavated material above the opening end 13K based on the icon CB aligned with the photograph data of the opening end 13K of the bucket 13, and calculate the area of the excavated material above the opening end 13K. Consequently, even if the opening end 13K cannot be identified from the photograph data due to the dirty surface of the bucket 13 and the peeled coating on the surface of the bucket 13, the opening end 13K of the bucket 13 is easily specified, and the boundary between the excavated material and the bucket 13 is distinguished. The excavation amount calculation unit 614 can calculate the area of the excavated material above the opening end 13K and calculate the excavation amount of the bucket 13.

Moreover, in the embodiment, the display device 64 includes the touchscreen. The input device 65 includes the touch sensor provided to the display screen of the display device 64. Hence, the worker Mb or operator Ma can specify the opening end 13K of the bucket 13 simply by operating the display screen of the display device 64, sliding and moving the icon CB, and aligning the line CBK of the icon CB with the opening end 13K of the bucket 13 displayed on the display screen of the display device 64.

Moreover, according to the embodiment, after moving the upper structure template 21T scanning the search area 73, and calculating the position data of the upper structure 21 based on the correlation value between the photograph data of the upper structure 21 and the upper structure template 21T, the position data calculation unit 604 moves the boom template 11T over the search area 73 to calculate the position data of the boom 11 based on the correlation value between the photograph data of the boom 11 and the boom template 11T. Consequently, also in the excavator 3 having a characteristic structure where the work equipment 10 that moves relative to the base machine 20 exists, the position of the work equipment 10 can be identified. In the embodiment, the position of the upper structure 21 including the boom pin 11P is identified by pattern matching. The position of the boom 11 is then identified with reference to the boom pin 11P. Accordingly, the position of the boom 11 is accurately identified. After the position of the boom 11 is identified, the position of the arm 12 is identified with reference to the arm pin 12P. After the position of the arm 12 is identified, the position of the bucket 13 is identified with reference to the bucket pin 13P. Accordingly, also in the excavator 3 having the characteristic structure, the position of the cutting edges 13B of the bucket 13 can be accurately identified.

Moreover, according to the embodiment, the third display control unit 605C displays the guideline 70 such that the photographing device 63 is the specified distance away from the excavator 3 when the positions of the base machine 20 and the guideline 70 are determined on the display screen of the display device 64. The excavation amount calculation unit 614 calculates the excavation amount of the bucket 13 based on the icon CB aligned with the bucket 13 photographed by the photographing device 63 that is the specified distance away from the excavator 3. Consequently, the excavation amount of the bucket 13 is always calculated under the same evaluation condition. Moreover, the photographing position is set such that the excavator 3 is the specified distance away from the photographing device 63. Accordingly, the safety of the worker Mb who takes a picture is ensured.

Moreover, according to the embodiment, the evaluation apparatus 600 includes the target data acquisition unit 611 that acquires the target data indicating the target excavation amount of the bucket 13. The evaluation data generation unit 604 generates evaluation data based on the difference between the first detected data and the target data. Consequently, the skill of the operator Ma can be evaluated regarding the excavation amount in the actual excavation operation by specifying a given target excavation amount. For example, if the excavator 3 is used to perform excavation loading work where excavated material is loaded onto the bed of a dump truck, the operator Ma needs to make fine adjustments to the amount of excavation by the bucket 13 to make the loading amount appropriate. According to the embodiment, the target excavation amount is specified. The skill of the operator Ma is quantitatively evaluated in the respect that whether or not the operator Ma has the skill to execute an excavation operation close to the target excavation amount. Accordingly, the operator Ma's skill of actual excavation loading work can be evaluated.

Moreover, according to the embodiment, when the opening end 13K of the bucket 13 is identified, image processing is performed on the photograph data of the bucket 13 photographed by the photographing device 63 to calculate the excavation amount of the bucket 13 from the area of the excavated material above the opening end 13K of the bucket 13. Consequently, the excavation amount of the bucket 13 can be easily obtained without performing a complicated process.

Moreover, according to the embodiment, a link processing unit 606 that generates link data where the evaluation data is associated with position data of the photographing device 63 indicating the photographing position of the excavator 3, and a link data output unit 607 that outputs the link data are provided. The output of the link data enables the control apparatus 4 to make effective use of the link data and take measures for improving the skill of operators Ma in all parts of the country.

Figure 16:
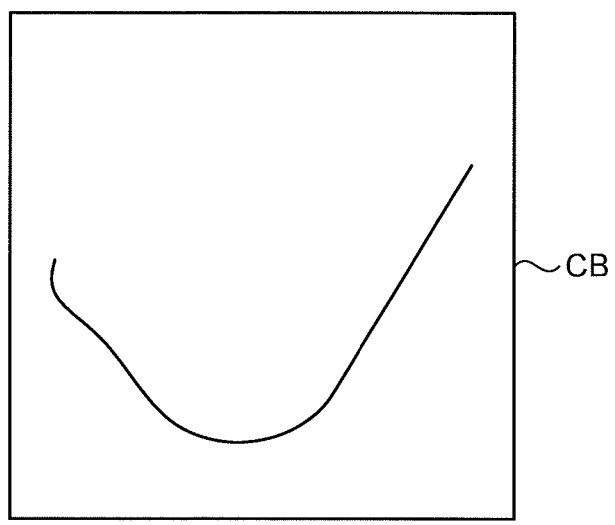
FIG. 16 is a diagram schematically illustrating an example of a graphic according to the embodiment.
Figure 17:
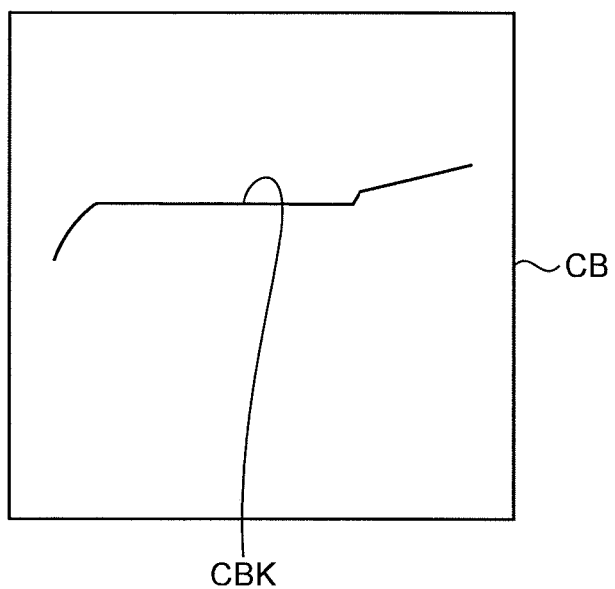
FIG. 17 is a diagram schematically illustrating an example of a graphic according to the embodiment.

FIGS. 16 and 17 are diagrams for explaining an example of the icon CB according to the embodiment. FIGS. 16 and 17 illustrate the icon CB representing part of an outline that indicates the outer shape of the bucket 13 as viewed from the left side. In the above-mentioned embodiment, as illustrated in FIG. 14, the icon CB is the graphic mimicking the shape of the bucket 13 as viewed from the side, and is assumed to include the entire outline of the bucket 13. As illustrated in FIG. 16, the icon CB may be a graphic representing only the outline of a lower portion (rear portion) of the bucket 13. As illustrated in FIG. 17, the icon CB may be a graphic representing only the outline of an upper portion (opening end) of the bucket 13. Even if the icon CB is a graphic representing part of the outline indicating the outer shape of the bucket 13, the positions of the icon CB and the bucket 13 are determined on the display screen of the display device 64, and accordingly it is possible to identify the position of the bucket 13 and distinguish the bucket 13 from the excavated material. In terms of the icon CB representing the outline indicating the outer shape of the bucket 13 such as illustrated in FIGS. 14, 16, and 17, data of a plurality of kinds of icons CB may be prepared in, for example, the storage unit 608 according to the shapes and sizes of the bucket 13, and the worker Mb may select any of the icons CB by operating the input device 65 according to the bucket 13 mounted on the work equipment 10 of the excavator 3 to be operated by the operator Ma.

Other Embodiments

In the above-mentioned embodiment, if it has been judged that the opening end 13K of the bucket 13 cannot be identified from the photograph data, the mobile apparatus 6 transitions to opening end specification mode in accordance with the computer program's process. The worker Mb may operate the input device 65 to transition to opening end specification mode. Moreover, the excavator 3 may transmit outline data representing the outline indicating the outer shape of the bucket 13 to the mobile apparatus 6 by use of a wireless device, and the mobile apparatus 6 may receive the outline data to transition to opening end specification mode.

In the above-mentioned embodiment, the control apparatus 4 may have part or all of the functions of the evaluation apparatus 600. Operation data of the excavator 3 detected by the detection device 63 is transmitted to the control apparatus 4 via the communication device 67. Accordingly, the control apparatus 4 can evaluate the skill of the operator Ma based on the operation data of the excavator 3. The control apparatus 4 includes the arithmetic processing unit 40 and the storage device 41 where the computer program for executing the evaluation method according to the embodiment can be stored. Accordingly, the functions of the evaluation apparatus 600 can be achieved.

In the above-mentioned embodiment, it is assumed that the skill of the operator Ma is evaluated based on the operation data of the work equipment 10. The operating state of the work equipment 10 may be evaluated based on the operation data of the work equipment 10. For example, a check process of judging whether or not the operating state of the work equipment 10 is normal may be executed based on the operation data of the work equipment 10.

In the above-mentioned embodiment, the work vehicle 3 is assumed to be the excavator 3. The work vehicle 3 is simply required to be a work vehicle including work equipment and attachments that can scoop excavated material, such as a backhoe loader or wheel loader.

REFERENCE SIGNS LIST

1 EVALUATION SYSTEM
2 CONSTRUCTION SITE
3 EXCAVATOR (WORK VEHICLE)
3C EXCAVATOR (WORK VEHICLE)
4 CONTROL APPARATUS (SERVER)
6 MOBILE APPARATUS
7 DRIVER'S SEAT
8 OPERATING DEVICE
8WR RIGHT OPERATING LEVER
8WL LEFT OPERATING LEVER
8MR RIGHT TRAVEL LEVER
8ML LEFT TRAVEL LEVER
10 WORK EQUIPMENT
11 BOOM
11P BOOM PIN
12 ARM
12P ARM PIN
13 BUCKET
13B CUTTING EDGE
13K OPENING END
13P BUCKET PIN
14 BOOM CYLINDER
15 ARM CYLINDER
16 BUCKET CYLINDER
20 BASE MACHINE
21 UPPER STRUCTURE
22 UNDERCARRIAGE
23 CAB
24 COUNTERWEIGHT
25 DRIVE WHEEL
26 IDLER WHEEL
27 CRAWLER
40 ARITHMETIC PROCESSING UNIT
41 STORAGE DEVICE
42 OUTPUT DEVICE
43 INPUT DEVICE
44 INPUT/OUTPUT INTERFACE DEVICE
45 COMMUNICATION DEVICE
60 ARITHMETIC PROCESSING UNIT (EVALUATION APPARATUS)
61 STORAGE DEVICE
62 POSITION DETECTION DEVICE
63 PHOTOGRAPHING DEVICE
63C DETECTION DEVICE
64 DISPLAY DEVICE
65 INPUT DEVICE
66 INPUT/OUTPUT INTERFACE DEVICE
67 COMMUNICATION DEVICE
70 GUIDELINE
73 SEARCH AREA
600 EVALUATION APPARATUS
601 DETECTED DATA ACQUISITION UNIT
602 POSITION DATA CALCULATION UNIT
603 TARGET DATA GENERATION UNIT
604 EVALUATION DATA GENERATION UNIT
605 DISPLAY CONTROL UNIT
605A FIRST DISPLAY CONTROL UNIT
605B SECOND DISPLAY CONTROL UNIT
606 LINK PROCESSING UNIT
607 LINK DATA OUTPUT UNIT
608 STORAGE UNIT
611 TARGET DATA ACQUISITION UNIT
612 INPUT DATA ACQUISITION UNIT
613 EXCAVATION TIME CALCULATION UNIT
614 EXCAVATION AMOUNT CALCULATION UNIT
614A IDENTIFICATION UNIT
AX1 ROTATION AXIS
AX2 ROTATION AXIS
AX3 ROTATION AXIS
CA ICON
CB ICON
DX1 ROTATION AXIS
DX2 ROTATION AXIS
Ma OPERATOR
Mb WORKER
RX SWING AXIS

The invention claimed is:
1. A working equipment operator evaluation apparatus for evaluating the operation of the work equipment, the evaluation apparatus comprising:

a detected data acquisition unit configured to acquire photograph data of a bucket of a work equipment;

a first display control unit configured to display the photograph data on a display screen of a display device;

a second display control unit configured to display on the display screen a graphic representing at least part of an outline of the bucket as viewed from a side and enabling movement of the graphic on the display screen by an operation of an input device;

an identification unit configured to distinguish the bucket from excavated material above an opening end of the bucket on the display screen based on the graphic aligned with the bucket; and an excavation amount calculation unit configured to calculate an excavation efficiency in an excavation operation of the bucket by determining an area of the excavated material existing above the opening end of the bucket.

2. The evaluation apparatus according to claim 1, wherein the graphic includes a line representing the opening end of the bucket.

3. The evaluation apparatus according to claim 1, wherein the input device includes an input device provided to the display screen.

4. The evaluation apparatus according to claim 1, wherein
the work equipment is operated by an operator through an operating device to perform the excavation operation, and the evaluation apparatus comprises an evaluation data generation unit configured to generate evaluation data of the operator related to the excavation operation based on a first detected data indicating an excavation amount calculated by the excavation amount calculation unit and a second detected data indicating excavation time.

5. The evaluation apparatus according to claim 4, further comprising a target data acquisition unit configured to acquire target data indicating a target excavation amount of the bucket, wherein the evaluation data generation unit generates the evaluation data based on a difference between the first detected data and the target data.

6. An evaluation method for evaluating the operation of a work equipment comprising:

acquiring photograph data of a bucket of a work equipment;

displaying the photograph data on a display screen of a display device;

displaying on the display screen a graphic representing at least part of an outline of the bucket as viewed from a side;

moving the graphic on the display screen based on input data generated by an operation of an input device to a position on the displayed photograph data corresponding to the bucket of the work equipment; and distinguishing the bucket from excavated material above an opening end of the bucket on the display screen based on the graphic being aligned with the bucket.

7. The evaluation apparatus according to claim 2, wherein
the work equipment is operated by an operator through an operating device to perform the excavation operation, and the evaluation apparatus comprises an evaluation data generation unit configured to generate evaluation data of the operator related to the excavation operation based on a first detected data indicating an excavation amount calculated by the excavation amount calculation unit and a second detected data indicating excavation time.

8. The evaluation apparatus according to claim 3, wherein
the work equipment is operated by an operator through an operating device to perform the excavation operation, and the evaluation apparatus comprises an evaluation data generation unit configured to generate evaluation data of the operator related to the excavation operation based on first detected data indicating an excavation amount calculated by the excavation amount calculation unit and second detected data indicating excavation time.

9. The evaluation apparatus according to claim 7, comprising a target data acquisition unit configured to acquire target data indicating a target excavation amount of the bucket, wherein the evaluation data generation unit generates the evaluation data based on a difference between the first detected data and the target data.

10. The evaluation apparatus according to claim 8, comprising a target data acquisition unit configured to acquire target data indicating a target excavation amount of the bucket, wherein the evaluation data generation unit generates the evaluation data based on a difference between the first detected data and the target data.

11. A computer program for evaluating an operator of a working equipment, the computer program being stored in a portable device, comprising:

acquiring photograph data of a bucket of a work equipment;

displaying the photograph data on a display screen of a display device;

displaying on the display screen a graphic representing at least part of an outline of the bucket as viewed from a side;

moving the graphic to a position of the displayed photograph data corresponding to the bucket of the working equipment on the display screen based on input data generated by an operation of an input device; and distinguishing the bucket from excavated material above an opening end of the bucket on the display screen based on the graphic aligned with the bucket.

* * * * *